US 8,209,715 B2

(12) United States Patent
Liao et al.

(10) Patent No.: US 8,209,715 B2
(45) Date of Patent: Jun. 26, 2012

(54) VIDEO PLAY THROUGH RATES

(75) Inventors: Lin Liao, Bothell, WA (US); Manish Gupta, Santa Clara, CA (US); Rajas Moonka, San Ramon, CA (US)

(73) Assignee: Google Inc., Mountain View, CA (US)

( * ) Notice: Subject to any disclaimer, the term of this patent is extended or adjusted under 35 U.S.C. 154(b) by 315 days.

(21) Appl. No.: 12/271,395

(22) Filed: Nov. 14, 2008

(65) Prior Publication Data
US 2010/0125871 A1 May 20, 2010

(51) Int. Cl.
*H04N 7/16* (2011.01)
*H04N 7/10* (2006.01)
*H04N 5/455* (2006.01)

(52) U.S. Cl. ................. 725/34; 725/35; 725/46; 725/50

(58) Field of Classification Search ..................... 725/10, 725/32, 34, 35, 46, 50, 116, 134
See application file for complete search history.

(56) References Cited

U.S. PATENT DOCUMENTS

| | | | |
|---|---|---|---|
| 6,269,361 | B1 | 7/2001 | Davis et al. |
| 6,463,585 | B1 * | 10/2002 | Hendricks et al. ............... 725/35 |
| 7,124,125 | B2 | 10/2006 | Cook et al. |
| 2003/0067554 | A1 * | 4/2003 | Klarfeld et al. ............... 348/461 |
| 2003/0093792 | A1 * | 5/2003 | Labeeb et al. .................. 725/46 |
| 2004/0030599 | A1 | 2/2004 | Sie et al. |
| 2005/0097204 | A1 | 5/2005 | Horowitz et al. |
| 2005/0144064 | A1 | 6/2005 | Calabria et al. |
| 2005/0144065 | A1 | 6/2005 | Calabria et al. |
| 2005/0144069 | A1 | 6/2005 | Wiseman et al. |
| 2006/0031214 | A1 | 2/2006 | Solaro et al. |
| 2006/0149721 | A1 | 7/2006 | Langford |
| 2006/0224445 | A1 | 10/2006 | Axe et al. |
| 2006/0256133 | A1 * | 11/2006 | Rosenberg ..................... 345/619 |
| 2006/0282328 | A1 | 12/2006 | Gerace et al. |
| 2007/0027754 | A1 | 2/2007 | Collins et al. |
| 2007/0055695 | A1 | 3/2007 | Dorai et al. |
| 2007/0129995 | A1 | 6/2007 | Brandow |
| 2007/0130159 | A1 | 6/2007 | Gulli et al. |
| 2007/0157228 | A1 | 7/2007 | Bayer et al. |

(Continued)

FOREIGN PATENT DOCUMENTS

KR    10 2003 0071591    7/2000

(Continued)

OTHER PUBLICATIONS

International Search Report and the Written Opinion of the International Searching Authority, or the Declaration for PCT/US2009/064130 dated May 31, 2010 (11 pages).

(Continued)

*Primary Examiner* — Kieu Oanh T Bui
(74) *Attorney, Agent, or Firm* — Fish & Richardson P.C.

(57) ABSTRACT

A request for video advertisements is received and video advertisements that can be provided in response to the request are identified. Performance features associated with the video advertisements are identified and are provided as input to a video advertisement performance model trained to estimate a play through rate for each of the video advertisements. The video advertisements are ranked based on the estimated play through rates for the video advertisements provided by the video advertisement performance model, and one or more video advertisements are provided in response to the request according to the ranking of the video advertisements.

20 Claims, 7 Drawing Sheets

U.S. PATENT DOCUMENTS

| | | |
|---|---|---|
| 2007/0162335 A1 | 7/2007 | Mekikian |
| 2007/0226053 A1 | 9/2007 | Carl et al. |
| 2008/0154889 A1 | 6/2008 | Pfeiffer |
| 2008/0222199 A1 | 9/2008 | Tiu et al. |
| 2008/0249832 A1 | 10/2008 | Richardson et al. |
| 2009/0019034 A1 | 1/2009 | Franks et al. |
| 2009/0037262 A1 | 2/2009 | Patil |
| 2009/0037263 A1 | 2/2009 | Patil |
| 2009/0043649 A1 | 2/2009 | Wright et al. |
| 2009/0076886 A1 | 3/2009 | Dulitz et al. |
| 2009/0089161 A1 | 4/2009 | Ali et al. |
| 2009/0099909 A1 | 4/2009 | Phan |
| 2009/0106100 A1 | 4/2009 | Mashinsky |
| 2009/0119166 A1 | 5/2009 | Taylor et al. |
| 2009/0164419 A1 | 6/2009 | Taylor et al. |
| 2009/0177537 A1 | 7/2009 | Taylor et al. |
| 2010/0082439 A9 | 4/2010 | Patel et al. |

FOREIGN PATENT DOCUMENTS

| | | |
|---|---|---|
| KR | 10 2003 0029410 | 4/2003 |
| KR | 10-2000-0036647 | 9/2003 |
| WO | WO 2004/068299 A2 | 8/2004 |
| WO | WO 2005/057238 A2 | 6/2005 |
| WO | WO 2006/062760 A2 | 6/2006 |

OTHER PUBLICATIONS

Notification Concerning Transmittal of International Preliminary Report on Patentability, PCT/US2008/087175, Jul. 1, 2010, 8 pages.

Notification Concerning Transmittal of International Preliminary Report on Patentability, PCT/US2008/087253, Jul. 22, 2010, 6 pages.

Arrington, Michael, "Google PPC Video Ads—Why I'm Betting Against It", May 23, 2006, TechCrunch, 13 pages.

Notification Concerning Transmittal of International Preliminary Report on Patentability for PCT/US2009/064130 dated May 26, 2011, 6 pages.

PCT/US2008/087175 International Search Report and Written Opinion, Apr. 29, 2009, 13 pages.

PCT/US2008/082519 International Search Report and Written Opinion, Feb. 27, 2009, 12 pages.

PCT International Search Report and The Written Opinion Of The International Searching Authority, PCT/US2008/87253, mailed Aug. 26, 2009, 11 pages.

* cited by examiner

VIDEO PLAY THROUGH RATES

BACKGROUND

This disclosure relates to ranking video advertisements.

The Internet provides for the targeting of advertisements ("ads") to receptive audiences. For example, some websites provide information search functionality that is based on keywords entered by a user seeking information. This user query can be an indicator of the type of information of interest to the user. By comparing the user query to a list of keywords specified by an advertiser, it is possible to provide targeted ads to the user.

Another form of online advertising is ad syndication, which allows advertisers to extend their marketing reach by distributing ads to additional partners. For example, third party online publishers can place an advertiser's text or image ads on web properties with desirable content to drive online customers to the advertiser's website.

In some online advertising systems, advertisers bid for their ads on a Cost-Per-Click (CPC) basis. A common way for advertisers to set a CPC is to take a target Cost-Per-Action (CPA) and multiply the CPA by an average conversion rate on a keyword. CPA is an online advertising Return-On-Investment (ROI) metric in which return is based solely on qualifying actions, such as a sale or registration, as measured against the marketing costs associated with reaching that sale or registration.

Such evaluation metrics, however, may not be indicative of the performance of an advertisement, particularly if the advertisement is a video advertisement. For example, a user may enter a query and a video ad may be served that appears highly relevant to the user's query, and the user may thus click on the ad to watch the video. However, the video may be of poor quality, may be directed to subject matter not related to the associated advertisement, or may include other content that causes a poor user experience. As a result, the user may only view a small portion of the video advertisement, which may not be beneficial to the advertiser or the publisher.

SUMMARY

Disclosed herein are systems, apparatus, computer program products and methods for providing video advertisements. In one implementation, a request for video advertisements is received, and video advertisements are identified that can be provided in response to the request. Performance features associated with the video advertisements are identified. The performance features and the video advertisements are provided as input to a video advertisement performance model trained to estimate a play through rate for each of the video advertisements. The estimated play through rate is the likelihood that a video advertisement provided in response to the request is viewed at least a predetermined amount of its duration. The video advertisements are ranked based on the estimated play through rates for the video advertisements provided by the video advertisement performance model, and one or more video advertisements are provided in response to the request according to the ranking of the video advertisements.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
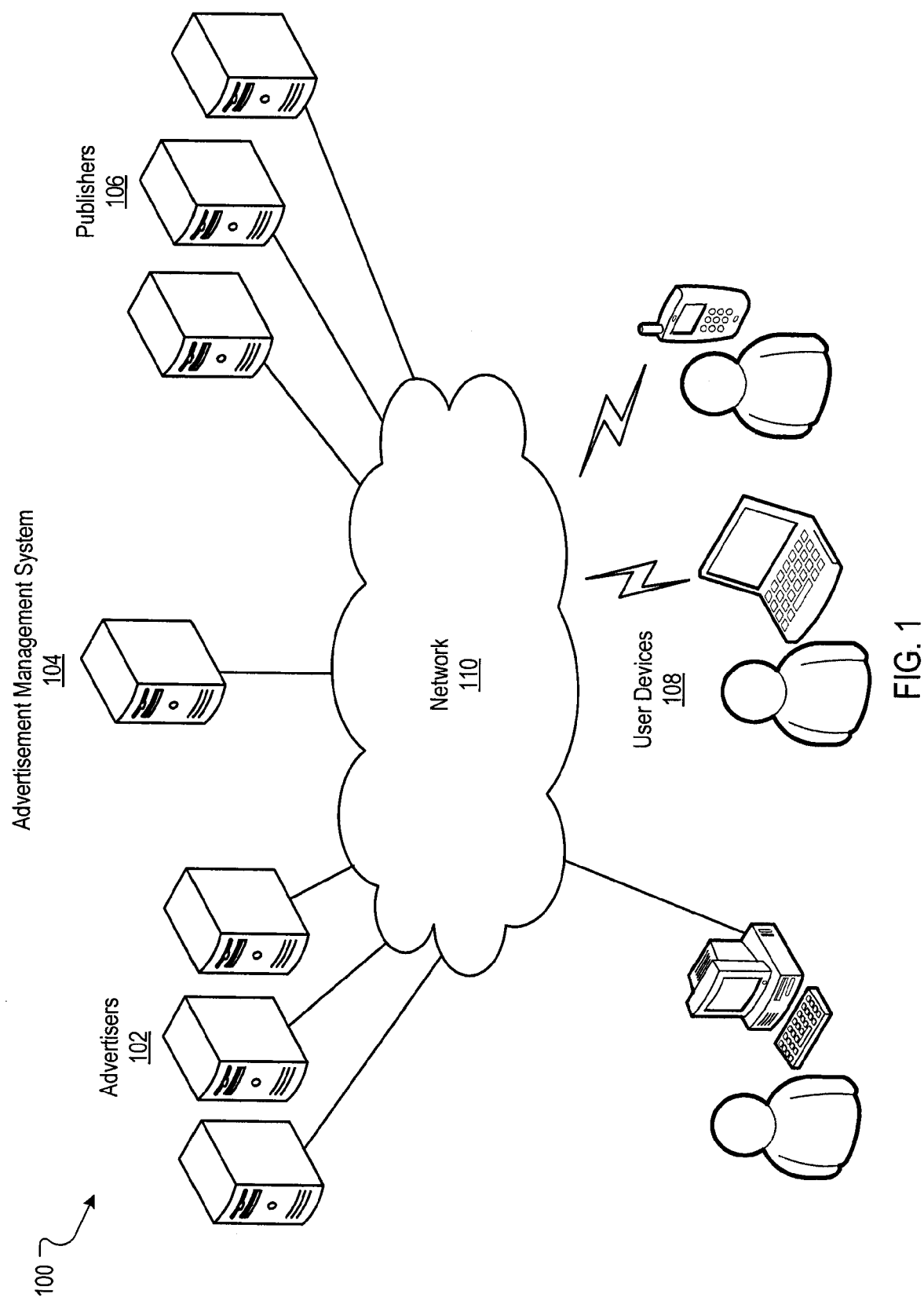
FIG. 1 is a block diagram of an example online advertising environment.

FIG. 1 is a block diagram of an implementation of an online advertising environment 100. A computer network 110, such as a local area network (LAN), wide area network (WAN), the Internet, or a combination thereof, connects advertisers 102, an advertising system 104, publishers 106, and user devices 108. In some implementations, the advertisers 102 can directly, or indirectly, enter, maintain, and track advertisement ("ad") information in the advertisement management system 104. Though reference is made to advertising, other forms of content, including other forms of sponsored content, can be delivered by the system 100.

The ads may be in the form of graphical ads, such as banner ads, text only ads, image ads, audio ads, video ads, ads combining one of more of any of such components. The ads may also include embedded information, such as a links, meta-information, and/or machine executable instructions that link to landing pages, such as pages on the advertisers 102 websites, that a user is directed to when the user clicks an ad presented on a publisher website. One or more publishers 106 may submit requests for ads to the system 104. The system 104 responds by sending ads to the requesting publisher 106 for placement on one or more of the publisher's web properties (e.g., websites and other network-distributed content).

The advertisers 102, publishers 106 and/or user devices 108 can provide usage information to the system 104. This usage information can include measured or observed user behavior related to ads that have been served. For text ads and banner ads, for example, the usage information can include whether or not a conversion or click-through related to an ad has occurred. For video ads, the usage can include whether the video ad was "clicked to play," how much of the video was viewed by a user, and whether the user browsed a landing page related to the video ad.

A "click to play" video ad is a video ad that is shown as a still frame in a browser on a user device 108 and begins playing when a user clicks on the still frame. Data indicating subsequent user actions taken at the user device 108 can be collected by the system 104. This data can be indicative of how much of the video advertisement was viewed by the user. For example, if a user of the user device 108 pauses or closes a 15-second video advertisement at five seconds, the browser on the user device 108 can send data indicative of this action to the system 104. Accordingly, the system 104 can determine that 33% of the video ad ($5/15$) was viewed by the user.

Similarly, if a user causes the web browser on the user device 108 to navigate to another web page after beginning playback of the video ad, then the data may indicate at what time during the playback the user navigated to another web page. If the web page is not related to the video advertisement, e.g., is not a landing page for the video advertisement, then the system 104 can determine that percentage of the video ad viewed by dividing the time at which the user navigated to another web page by the total time of the video ad.

Other ways of determining a percentage of the video ad that was viewed can also be used. The percentages for each advertisement can be measured according to a central tendency, such as an average, to determine an overall play-through rate for the video ad. In some implementations, the play through rates can be quantized according to threshold rates. Thus, the quality of a video ad can be measured by how often the video ad was played (e.g., a play rate) and by quartile play through rates, i.e., how often the video ad is viewed 25%, 50%, 75% and 100%. In some implementations, the play-through rates for the video ads can also be partitioned according to publishers. For example, a video ad displayed on a first publisher's web site may have different play through rates than the video ad displayed at a second publisher's web site, and these different play through rates are indicated by the partition.

The system 104 performs financial transactions, such as crediting the publishers 106 and charging the advertisers 102 based on the usage information.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user device 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example of a publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The search service can combine the search results with one or more of the ads provided by the system 104. This combined information can then be forwarded to the user device 108 that requested the content. The search results can be maintained as distinct from the ads, so as not to confuse the user between paid advertisements and presumably neutral search results.

In some implementations, the advertisement management system 104 includes an auction process to select advertisements. Advertisers may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For text or still image ads, a click may cause the browser of a user device 108 to navigate to a landing page associated with the ad. For video ads, a click can cause the video ad to begin playing, if the video ad is a click to play video ad.

For purposes of illustrating an example auction, assume advertisers A, B, and C all select, or bid, a maximum cost-per-click of $0.50, $0.75, and $1.00, respectively, for advertisements A, B, and C. The maximum amount advertiser A will pay for a click on advertisement A is $0.50, the maximum amount advertiser B will pay for advertisement B is $1.00, and the maximum amount advertiser C for advertisement C will pay is $0.75.

The rank of an advertisement that is displayed is determined by multiplying the maximum cost-per-click for the advertisement by a quality score of the advertisement. The advertisement can then be placed among other advertisements in order of increasing or decreasing rank. For example, suppose the quality score of advertisements A, B, and C are "3," "1," and "1," respectively. The rank of advertisements A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisements are thus ranked as follows:

1. A
2. C
3. B

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisements A, B, and C can be determined as follows:

A: C's rank/A's quality score=1/3=$0.33+$0.01=$0.34

C: B's rank/C's quality score=0.75/1=$0.75+$0.01=$0.76

B: minimum cost-per-click=$0.20

In this example, A would only have to pay $0.34 to hold the first position in the list for advertisement A. C would have to pay $0.76 to hold the second position. Advertiser B would be required to pay the minimum cost-per-click amount of $0.20.

The quality score for an advertisement can be determined in a variety of ways. For advertisements that cause a browser to navigate to a landing page when the advertisement is selected, such as a text ad with an embedded URL, the quality score can be based on the landing page and, optionally, one or more keywords associated with the advertisement and present in either a query or the content of the page in which the advertisement is displayed.

In some implementations, the quality score for video ads can be adjusted based on an estimated play through rate of the video advertisement. The system 104 includes a video ad scoring system that generates a video ad quality score of video advertisements. The video ad quality score, in turn, can be used to adjust the quality score of an ad, which, in turn, adjusts a bidding parameter in the advertising auction.

Figure 2:
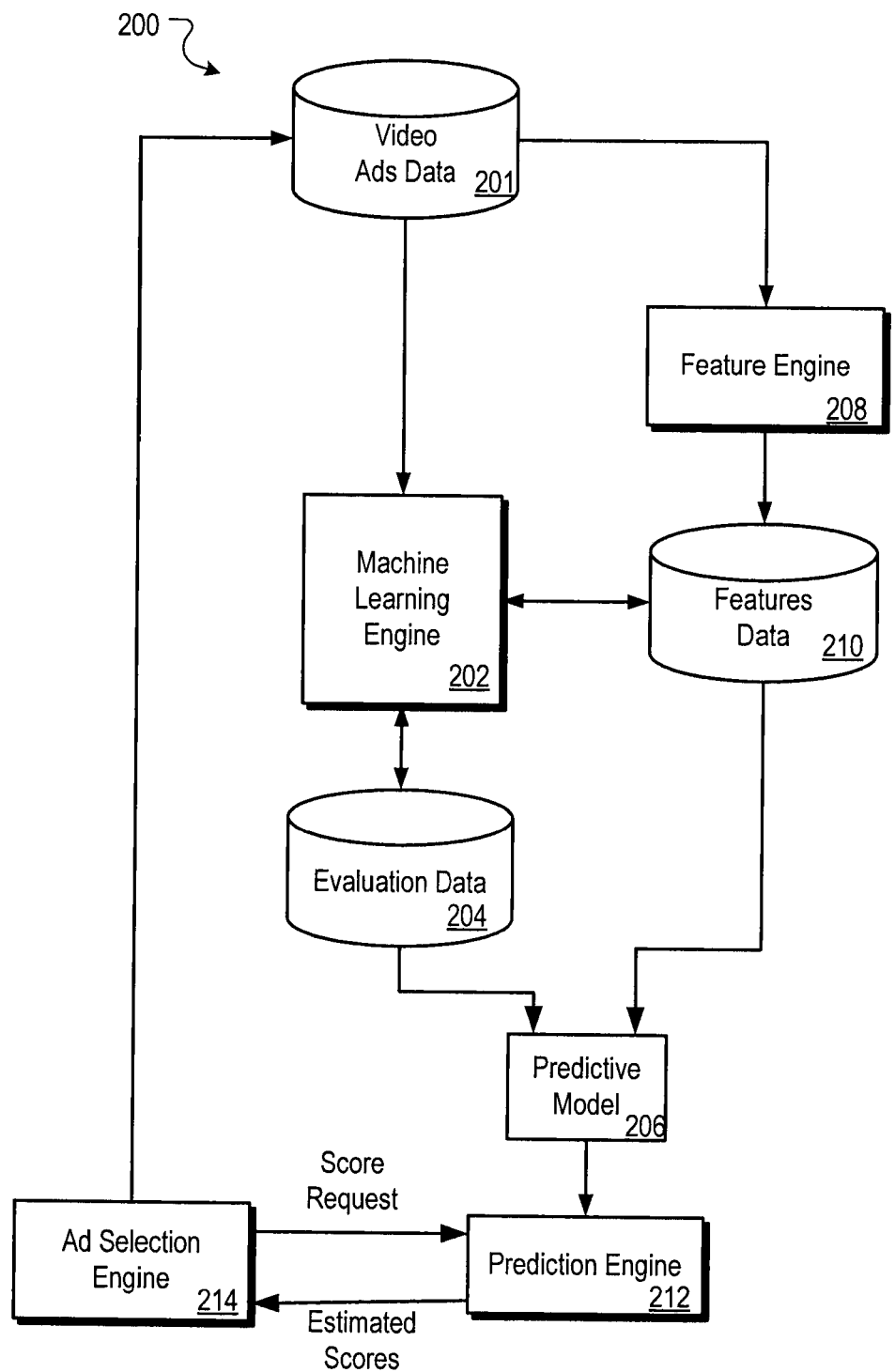
FIG. 2 is a block diagram of an example video ad scoring system.

FIG. 2 is a block diagram of an example video ad scoring system 200. The video ad scoring system 200 can utilize a variety of inputs to predict the quality of a particular video ad. These inputs can include both those inputs derived from the actual video ad and data from users' experiences (e.g., use patterns of the video ad). For example, the system 200 can identify features associated with each video ad. Such features include the advertiser associated with the video ad, a web property associated with the ad, play-through rates, etc. In some implementations, the system 200 can also use a predictive model trained on evaluation data to assign quality scores to the video ads.

In an example general flow of the system 200 for producing video ad quality scores, processing can begin with a machine learning engine 202 generating evaluation data 204 that can be used to train the predictive model 206. Example evaluation data can include actual historical performance data of the video ads. Such data can include click rates on the video ad and/or play through rates of the video ads. From this actual historical data video ad quality scores can be generated. For example, if a video ad quality score is based on the function of the play through rate of the video ad, then the actual play through rate can be used to generate the quality score.

In some implementations, the machine learning engine 202 can generate the evaluation data 204 from video ads data 201 containing video ads of known quality. Example video ads of known quality can include, for example, video ads that have historically demonstrated particular user experiences based on the features data. For example, video ads with a historically low play through rate relative to other video ads can be classified as "low quality," while video ads with a historically high play through rate relative to other video ads can be classified as "high quality."

In some implementations, a feature engine 208 can identify video ad features and generate features data 210 for the video ads. The feature engine 208 includes software instructions stored in computer readable medium and configured to identify the features of the video ads. The features data 210 associated with the video ads can include whether the video advertisement includes audio; whether the video advertisement is in color or black and white; whether the video ad includes animation; the size of the video ad; and any other identifiable and/or quantifiable features on which the machine learning engine 202 can be trained. In some implementation, the features data 210 includes feature weights that can be applied to the features in the predictive model 206.

In some implementations, features data 210 include a grouping identifier associated with the video ad. The grouping identifier can include a category associated with the video ad. For example, if the video ad is related to basketball, the grouping identifier may be "sports." Other features data can include a country associated with the video ad, a language associated with the video ad, as well as a creative associated with the video ad.

Features data 210 generated by feature engine 208 can be used by the machine learning engine 202 to train the predictive model 206. The machine learning engine 202 can comprise software instructions stored in computer readable medium and configured to access the evaluation data 204 and the features data 210 to generate the predictive model 206 for scoring video ads.

For example, the evaluation data 204 may include scoring data for 1,000 video ads that have been analyzed by the machine learning engine 202. The evaluation data may be partitioned into training data and testing data, e.g., data for 700 video ads may be used to train a predictive model 206 in the prediction engine 212, and data for the remaining 300 video ads may be used to test the predictive model 206.

In some implementations, the machine learning engine 202 can utilize regression analysis to train the predictive model 206. For example, the evaluation data 204 can be used to assign regression weights to the identified features stored as evaluation data 204 for the 700 video ads corresponding to the training data. The feature weights may then be iteratively adjusted and used to calculate a video ad quality score that substantially matches the video ad quality scores of the 700 video ads corresponding to the training data. Thereafter, the predictive model 206 may be tested on the test data corresponding to the remaining 300 video ads. If the machine learning engine 202 generates video ad quality scores substantially dissimilar to the video ad quality scores defined in the evaluation data 204, then the machine learning engine 202 can continue to iteratively training the predictive model. Conversely, if machine learning engine 202, applying the feature weights to the identified features related to the 300 video ads generates video ad quality scores substantially similar to the video ad quality scores defined in the evaluation data 204, then the predictive model 206 is determined to be accurately trained and can be utilized to evaluate video ad quality scores of any video ads. In this way, video ads, including video ads that may have not been evaluated in the evaluation process, can be assigned a video ad quality score based on the features in common with video ads that have already been evaluated. In some implementations, the performance model can comprise of a logistic regression model that includes a coefficient for each performance feature.

The features data 210 and evaluation data 204 can be updated over time as new video ads are added, or as existing video ads are updated. For example, the video ad scoring system 200 may automatically update an existing video ads based on user activity associated with the existing video. For example, the existing video may have been served by the advertisement system 104 and clicked on by a user, therefore the click-through rate feature of the existing video can be updated. The predictive model 206 may thus be tested and updated regularly to maintain accuracy.

A prediction engine 212 within the video ad scoring system 200 creates video ad quality scores using various inputs derived from the video ads data 201. In some implementations, the prediction engine 212 uses features data 210 and the predictive model 206 to produce the video ad quality scores. The prediction engine 212 can apply the predictive model 206 to the features data 210 and assign a video ad quality score based on similar video ads that have already been evaluated.

The advertisement system 104 may use the estimated video ad quality scores, for example, in the auction process (e.g., selecting ads using bid parameters such as maximum cost per click) and/or in the ranking system (e.g., prioritizing selected ads based on likely interest to the user).

In some implementations, the video ads quality scores indicate an estimated play through rate associated with the video ad. The estimated play through rate is a likelihood that the video ad is viewed at least a predetermined amount of its duration. For example, the likelihood, or percentage, that a video ad will be watched 50% of the duration of the video. The ad selection engine 214 can rank the video ads selected based on the estimated play through rates generated by the prediction engine 212.

In some implementations, a request for video ads can be received at the ad selection engine 214. The request can include one or more keywords in the form of a user query. The video ads can include video advertisements with various features. The features can include text, audio, images, video, animation, hypertext links, metadata describing the video, an advertiser associated with the video, a country associated with the video, a landing page or web property associated with the video ad, as well as a language associate with the video ad. In some implementations, the video ads may be indexed, for example, by advertiser, keyword, ad campaign, URL and/or content, or by other features.

The ad selection engine 214 can select one or more video ads that are responsive to the request. For example, the ad selection engine 214 can select video ads that include metadata that includes words that match the keywords in the request. For these selected video ads, the estimated scores can be generated, and the resulting highest ranked ads can be provided in response to the request.

For example, suppose the ad selection engine 214 selected three video advertisements in response to a request, advertisements A, B, and C, and the prediction engine 212 calculated the estimated play through rate of each to be "0.00002," "0.0006," and "0.003," respectively. Therefore, advertisement A has an estimated 0.002% chance of being viewed a predetermined amount of its duration; advertisement B has an estimated 0.6% chance of being viewed a predetermined amount of its duration; and advertisement C has an estimated 0.3% chance of being viewed a predetermined amount of its duration.

The ad selection engine 214 can rank the video ads by first calculating a quality adjustment or each video ad 204 based on the estimated play through rates generated by the prediction engine 212. In some implementations, the quality adjustment can include a number that is used to adjust the maximum cost per click associated with the video ad in the auction process described above. The ad selection engine 214 can first associate quality adjustments with a range of estimated play through rates.

For example, as shown in Table 1 below, the bin "Terrible" is associated with an estimated play through rate range of any number less than "0.0001." The bin "Very Bad" is associated with an estimated play through rate range from "0.0001" to any number less than "0.001." The bin "Bad" is associated with an estimated play rate range from "0.001" to any number less than "0.005." The bin "Good" is associated with an estimated play through rate of "0.005" to any number including "1."

TABLE 1

| Estimated Play Through Rate | Bin | Video Ad Adjustment |
|---|---|---|
| [0, 0.0001) | Terrible | .01 |
| [.0001, .001) | Very Bad | .1 |
| [.001, .005) | Bad | .2 |
| [.005, 1] | Good | 1 |

In the example above, Advertisement A with the estimated play through rate of "0.00002" belongs to the "Terrible" bin, Advertisement B with the estimated play through rate of "0.0006" belongs to the "Very bad" bin and Advertisement C with the estimated play through rate of 0.003 belongs to the "Bad" bin. The corresponding quality adjustment associated with each respective bin can be used to adjust the maximum cost-per-click of the advertisement.

The video quality scores can affect the maximum cost-per-click an advertiser will have to bid in order to outbid another video ad.

For example, the existing quality score of advertisements as described above are A, B, and C are "3," "1," and "1," respectively. Each quality score can be adjusted according to the video ads adjust score of the respective bin. Therefore, the new quality scores are calculated as follows:
  A: New quality score=quality score×video ad adjustment=3×0.01=0.03
  B: New quality score=quality score×video ad adjustment=1×0.1=0.1
  C: New quality score=quality score×video ad adjustment=1×0.2=0.2

Ranking the advertisements using this new quality score can be calculated as follows:
  A: Rank=new quality score×maximum cost-per-click=0.03×$0.50=0.015
  B: Rank=new quality score×maximum cost-per-click=0.1×$0.75=0.075
  C: Rank=new quality score×maximum cost-per-click=0.2×$1.00=0.2

The advertisements are now ranked as follows:
1. C
2. B
3. A

Prior to the quality of the video quality score being taken into account, the ranking as described above was:
  A: Rank=quality score×maximum cost-per-click=3.0×$0.50=1.50
  B: Rank=quality score×maximum cost-per-click=1.0×$0.75=0.75
  C: Rank=quality score×maximum cost-per-click=1.0×$1.00=1.00

The advertisements were ranked as follows:
1. A
2. C
3. B

The actual cost-per-click of advertisements A, B, and C can now be determined as follows:
  C: B's rank/C's quality score=0.075/0.2=$0.38+$0.01=$0.39
  B: A's rank/B's quality score=0.015/0.075=$0.2+$0.01=$0.21
  A: minimum cost-per-click=$0.20

In this example, C would only have to pay $0.39 to hold the first position in the list for advertisement C. B would have to pay $0.21 to hold the second position. Advertiser A would be required to pay the minimum cost-per-click amount of $0.20.

In some implementation, the estimated play through rates can be used by advertisers to change the maximum cost-per-click amount. For example, originally advertiser A had set a maximum cost-per-click amount of $0.50 for advertisement A. However, because the video associated with advertisement A has a poor estimated play through rate of "0.00002," in order for Advertiser A to maintain the same quality score of "3," advertiser A will have to the set the maximum cost-per-click 100 times greater than originally set. As advertisers will typically not make such adjustments, this will typically result is low quality ads not securing an advertising position by auction.

Other auction and ranking schemes that take into account the predicted play through rate of a video ad can also be used.

Figure 3:
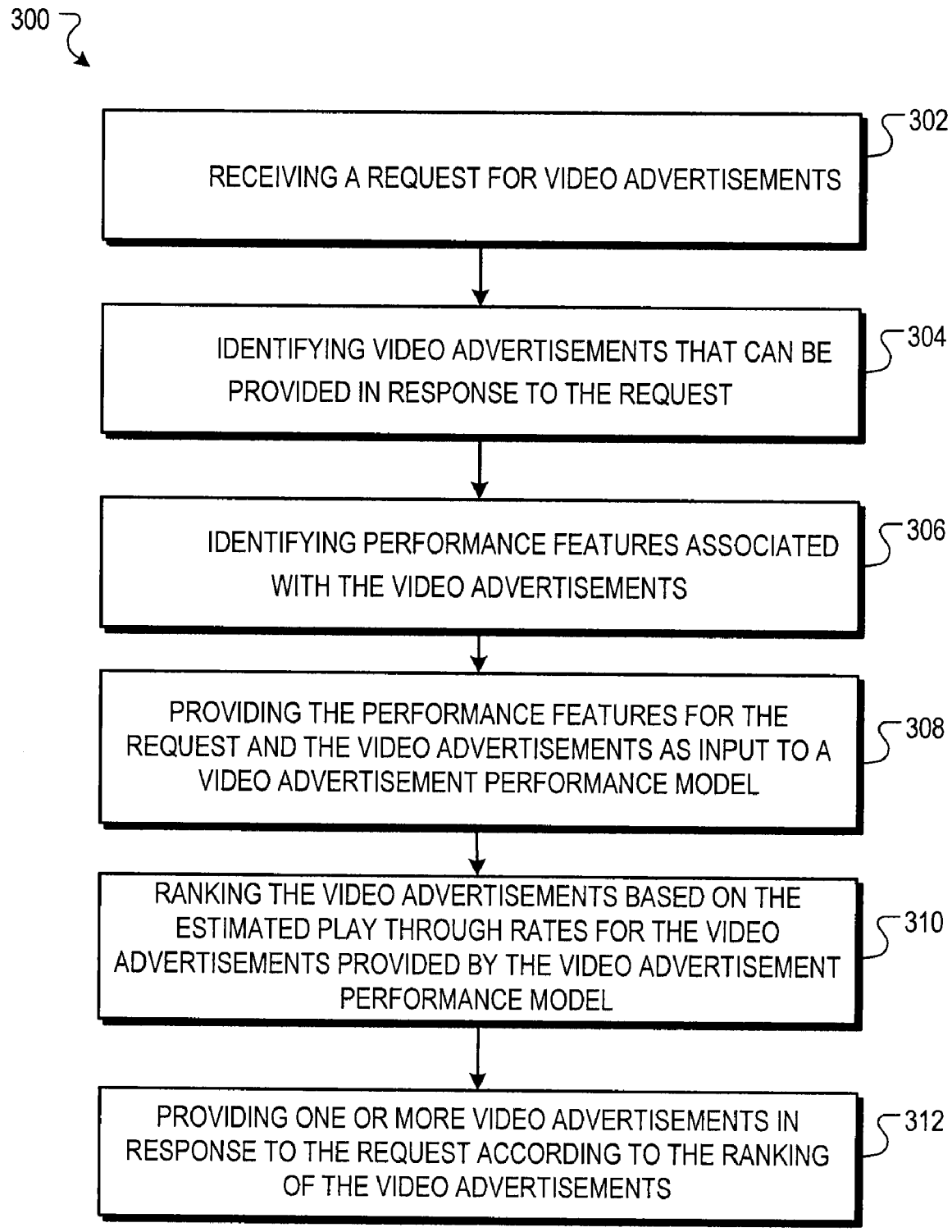
FIG. 3 is a flow diagram of an example process for identifying video advertisements in response to a query.

FIG. 3 is a flow diagram of an example process for identifying video advertisements in response to a query. The process 300 can, for example, be implemented in the system 200 of FIG. 2

Stage 302 receives a request for video advertisements. For example, referring to FIG. 3, the ad selection engine 214 can receive a request for video ads.

Stage 304 identifies video advertisements that can be provided in response to the request. For example, the ad selection engine 214 can identify video ads from video ads in response to the request.

Stage 306 identifies performance features associated with the video advertisements. For example, the feature engine 208 can identify features data 210 associated with the video ads.

Stage 308 provides the performance features for the request and the video advertisements as input to a video advertisement performance model trained to estimate a play through rate for each of the video advertisements. For example, the feature engine 208 can provide to the prediction engine 212 the video ads to estimate the play through rate for each of the video ads.

Stage 310 rank the video advertisements based on the estimated play through rates for the video advertisements provided by the video advertisement performance model. For example, the ad selection engine 214 may rank the video ads based on the video ad quality scores.

Stage 312 provides the one or more video advertisements in response to the request according to the ranking of the video advertisements. For example, the ad selection engine 214 may provide the one or more video advertisements in response to the request according to the ranking of the video advertisements.

Figure 4:
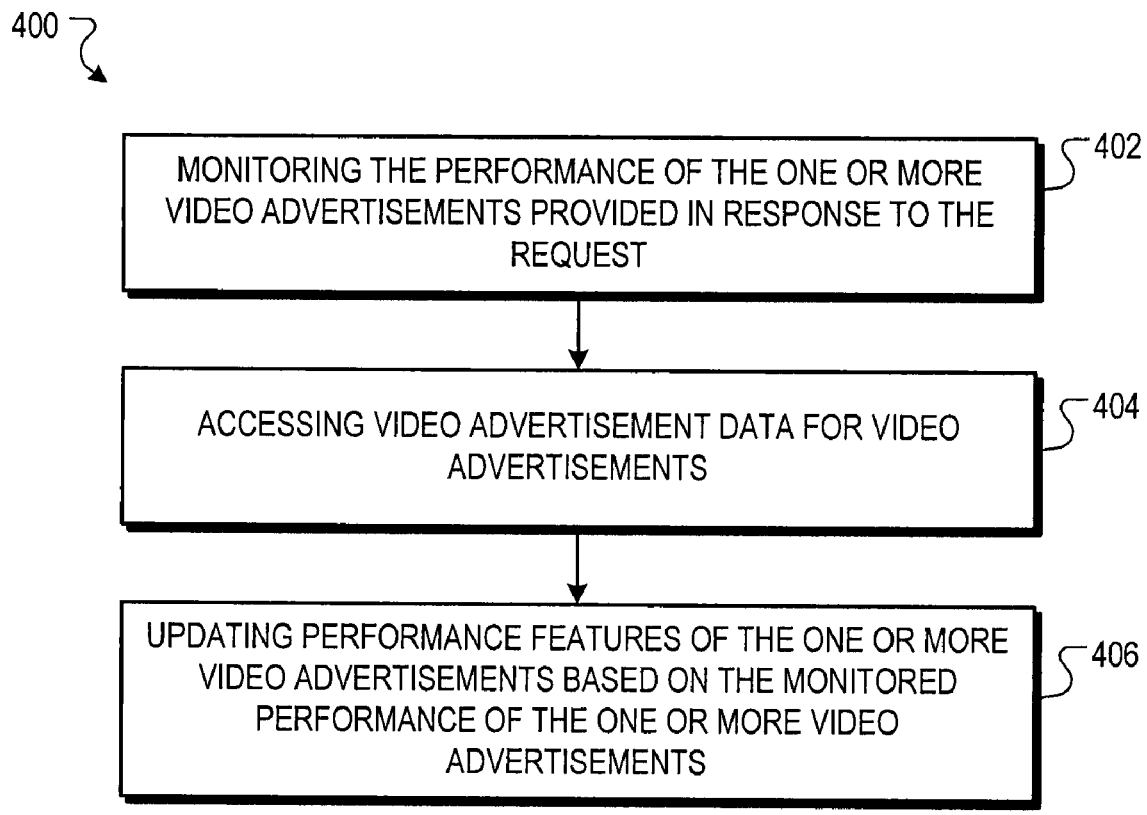
FIG. 4 is a flow diagram of an example process for updating performance features of video ads.

FIG. 4 is a flow diagram of an example process 400 for updating performance features of video ads. The process 400 can, for example, be implemented in the system 200 of FIG. 2.

Stage 402 monitors the performance of the one or more video advertisements provided in response to the request. For example, the feature engine 208 may monitor the performance of the one or more video ads.

Stage 404 accesses video advertisement data for video advertisements, the video advertisement data identifying video advertisements and performance features for each video advertisement. For example, the feature engine 208 may identify video ads and features data 210 for each video ad.

Stage 406 updates performance features of the one or more video advertisements based on the monitored performance of the one or more video advertisements. For example, the feature engine 208 may update the features data 210 based on the monitored performance.

Figure 5:
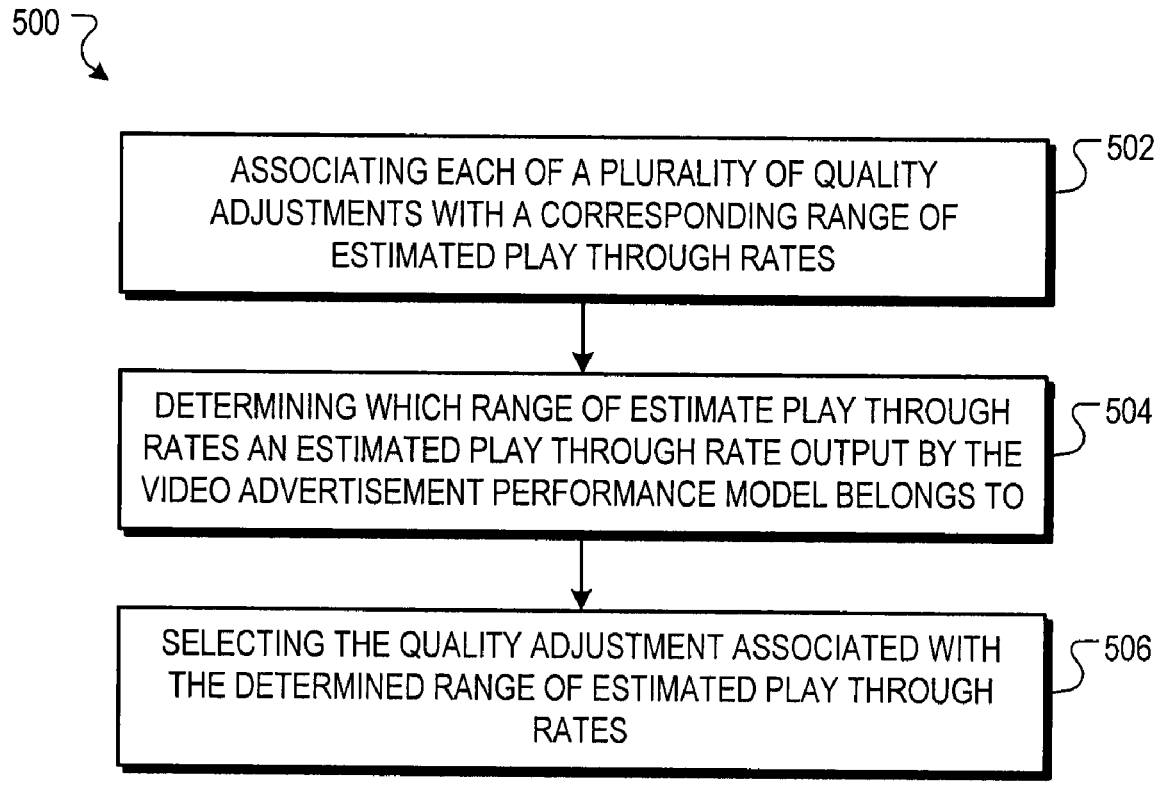
FIG. 5 is a flow diagram of an example process for calculating a quality adjustment for each video advertisement based on the estimated play through rates.

FIG. 5 is a flow diagram of an example process 500 for calculating a quality adjustment for each video advertisement based on the estimated play through rates. The process 500 can, for example, be implemented in the system 200 of FIG. 2.

Stage 502 associates each of a plurality of quality adjustments with a corresponding range of estimated play through rates. For example, the prediction engine 212 may associate each of a plurality of quality adjustments with a corresponding range of estimated play through rates.

Stage 504 determines which range of estimated play through rates an estimated play through rate output by the video advertisement performance model belongs to. For example, the prediction engine 212 may determine which range of estimated play through rates an estimated play through rate output by the video advertisement performance model belongs to.

Stage 506 selects the quality adjustment associated with the determined range of estimated play through rates. For example, the prediction engine 212 may select the quality adjustment associated with the determined range of estimated play through rates.

Figure 6:
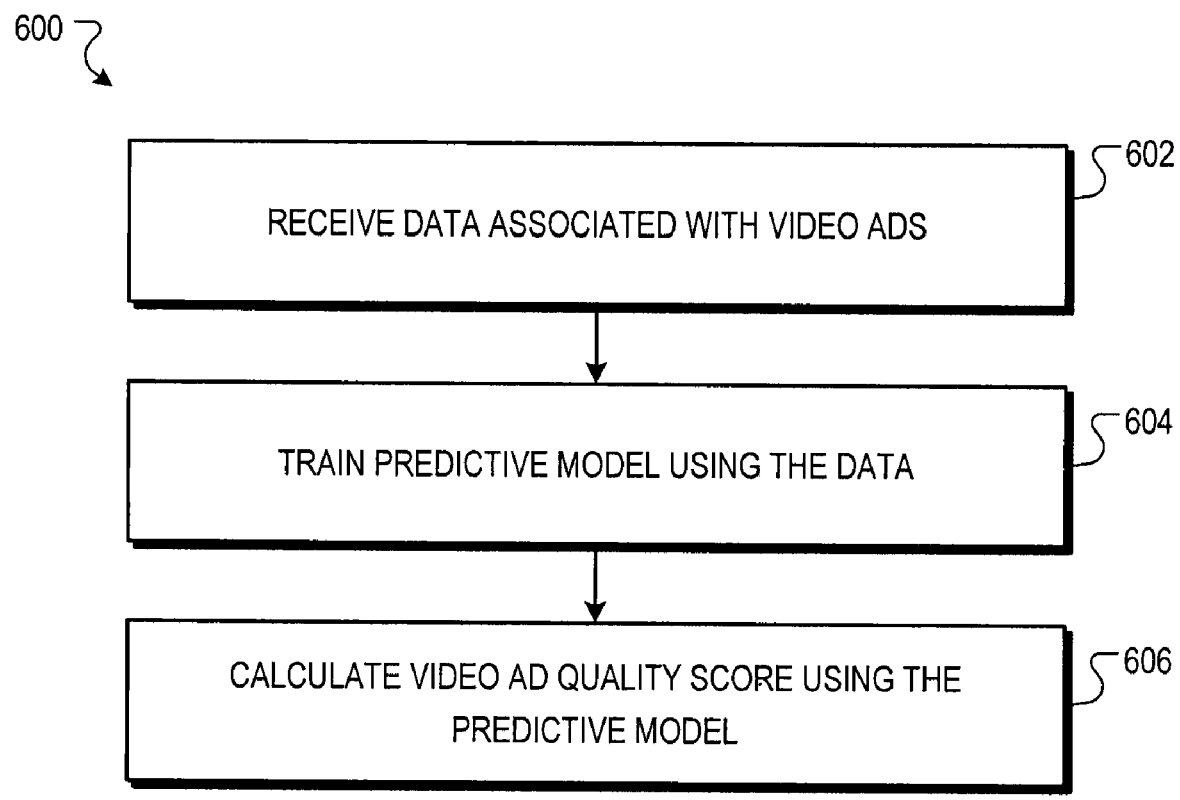
FIG. 6 is a flow diagram of an example process for calculating a quality adjustment for video advertisements using a predictive model.

FIG. 6 is a flow diagram of an example process 600 for calculating a quality adjustment for each video advertisement based on the estimated play through rates. The process 600 can, for example, be implemented in the system 200 of FIG. 2.

Stage 602 receives data associated with video ads. For example, the machine learning engine 202 can receive video ads data 201 associated with the video ads. The video ads data 201 can include data about existing video ads that Stage 604 trains a predictive model using the data. For example, the machine learning engine 202 trains the predictive model 206 using the data.

Stage 606 uses the predictive model to calculate video ad quality scores. For example, the prediction engine 212 uses the predictive model 206 to calculate video ad quality scores.

Figure 7:
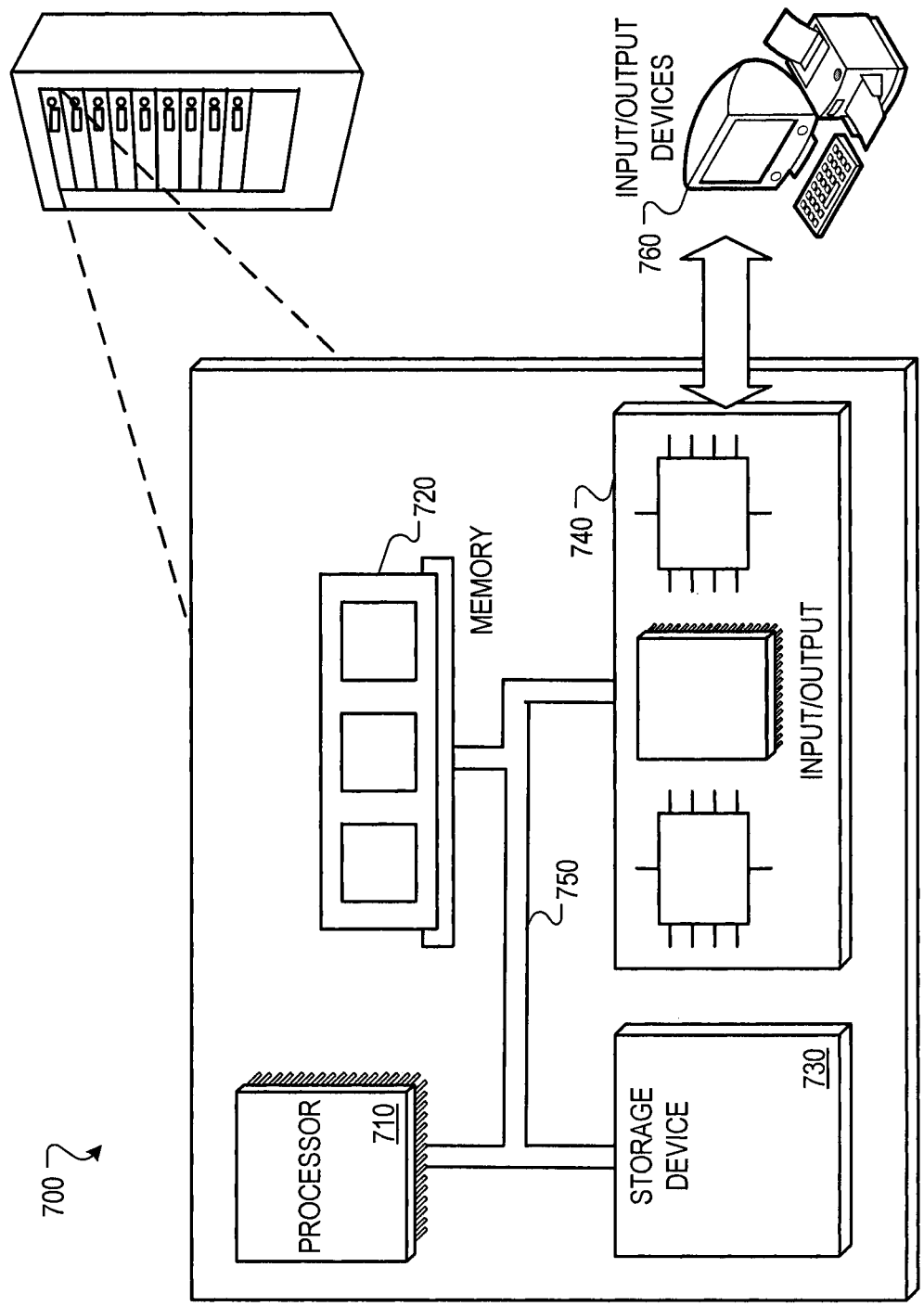
FIG. 7 is a schematic diagram of an example computer system that can be utilized to implement the systems and methods described herein.

FIG. 7 is a schematic diagram of an example computer system 700 that can be utilized to implement the systems and methods described herein. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In some implementations, the processor 710 is a single-threaded processor. In other implementations, the processor 710 is a multi-threaded processor. The processor 710 is capable of processing instructions stored in the memory 720 or on the storage device 730.

The memory 720 stores information within the system 700. In some implementations, the memory 720 is a computer-readable medium. In other implementations, the memory 720 is a volatile memory unit. In still other implementations, the memory 720 is a non-volatile memory unit.

The storage device 730 is capable of providing mass storage for the system 700. In some implementations, the storage device 730 is a computer-readable medium. In various different implementations, the storage device 730 can, for example, include a hard disk device, an optical disk device, or some other large capacity storage device.

The input/output device 740 provides input/output operations for the system 700. In some implementations, the input/output device 740 can include one or more network interface devices, e.g., an Ethernet card, a serial communication device, e.g., and a RS-232 port, and/or a wireless interface device, e.g., and an 802.11 card. In other implementations, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used.

Furthermore, the features and methods described can also be used in another form of online advertising such as ad syndication, which allows advertisers to extend their marketing reach by distributing advertisements to additional partners. For example, third party online publishers can place an advertiser's text or image advertisements on web properties with desirable content to drive online customers to the advertiser's website. An example of such a system is AdSense™ offered by Google, Inc. The features and methods described above can be used to allow the display of video elements along with the advertisements placed on the publisher's websites.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving, by one or more computers, a request for video advertisements;
   identifying, by the one or more computers, video advertisements that are eligible to be provided in response to the request;
   obtaining, by the one or more computers, an estimated play through rate for each of the video advertisements, the estimated play through rate for each of the video advertisements being a value indicative of a likelihood that at least a predetermined amount of a duration of the video advertisement will be presented prior to occurrence of a user action that halts presentation of the video advertisement;
   ranking, by the one or more computers, the video advertisements based on the estimated play through rates for the video advertisements; and
   providing, by the one or more computers, one or more of the video advertisements in response to the request and according to the ranking.

2. The method of claim 1, further comprising:
   obtaining data indicative of user interactions that cause presentation of the video advertisements;
   for each user interaction that causes presentation of a video advertisement;
   determining a presentation period for the video advertisement, the presentation period being a period between occurrence of the user interaction and occurrence of the user action that halts presentation of the video advertisement;
   determining the duration of the video advertisement that was presented, the duration being determined based on a ratio of the presentation period relative to a total duration of the video advertisement;
   determining whether the presentation of the video advertisement is a play through of the advertisement, wherein the presentation is determined to be a play through of the video advertisement when the duration of the video advertisement that was presented exceeds the predetermined duration; and
   updating performance features of the video advertisements, the performance features for each of the video advertisements being updated based on a portion of the user interactions with the video advertisement that resulted in a presentation that was determined to be a play through of the video advertisement.

3. The method of claim 2, further comprising:
   training a performance model using the performance features for the video advertisements, the performance model being trained to determine, based on features data for a video advertisement, the estimated play through rate of the video advertisement, the features data including data that are indicative of one or more visual features of the video advertisement.

4. The method of claim 3, wherein the performance model comprises a logistic regression model that includes coefficients for the visual features, the coefficient for each visual feature representing a relative weight of the visual feature for determining the estimated play through rate.

5. The method of claim 4, wherein the features data further include data that are indicative of one or more of a web property identifier; an advertiser identifier; a measured click through rate; geo location data; content of a web property associated with previous requests; and a measured play through rate.

6. The method of claim 1, wherein ranking the video advertisements based on the estimated play through rates for the video advertisements provided by the video advertisement performance model comprises:
   selecting a quality adjustment for each of the video advertisements, the quality adjustment for each of the video advertisements being selected based on the estimated play through rate for the video advertisement; and
   ranking the video advertisements based, at least in part, on the selected quality adjustments.

7. The method of claim 6, wherein selecting a quality adjustment for each of the video advertisements comprises:
   associating each of a plurality of quality adjustments with a corresponding range of estimated play through rates;
   for each of the video advertisements:
   determining the corresponding range of estimated play through rates that is inclusive of the estimated play through rate for the video advertisement; and
   selecting, as the quality adjustment for the video advertisement, the quality adjustment associated with the corresponding range of estimated play through rates that is inclusive of the estimated play through rate for the video advertisement.

8. The method of claim 7, wherein ranking the video advertisements based on the estimated play through rates further comprises:
for each of the video advertisements, adjusting a bid associated with the video advertisement based on the quality adjustment for the video advertisement.

9. The method of claim 1, wherein the predetermined amount is 50%.

10. A system comprising:
one or more computers; and
a computer-readable medium coupled to the one or more computers having instructions stored thereon which, when executed by the one or more computers, cause the one or more computers to perform operations comprising:
receiving a request for video advertisements;
identifying video advertisements that are eligible to be provided in response to the request;
obtaining an estimated play through rate for each of the video advertisements, the estimated play through rate for each of the video advertisements being a value indicative of a likelihood that at least a predetermined amount of a duration of the video advertisement will be presented prior to occurrence of a user action that halts presentation of the video advertisement;
ranking the video advertisements based on the estimated play through rates for the video advertisements; and
providing one or more of the video advertisements in response to the request and according to the ranking.

11. The system of claim 10, wherein the operations further comprise:
obtaining data indicative of user interactions that cause presentation of the video advertisements;
for each user interaction that causes presentation of a video advertisement:
determining a presentation period for the video advertisement, the presentation period being a period between occurrence of the user interaction and occurrence of the user action that halts presentation of the video advertisement;
determining the duration of the video advertisement that was presented, the duration being determined based on a ratio of the presentation period relative to a total duration of the video advertisement;
determining whether the presentation of the video advertisement is a play through of the advertisement, wherein the presentation is determined to be a play through of the video advertisement when the duration of the video advertisement that was presented exceeds the predetermined duration; and
updating performance features of the video advertisements, the performance features for each of the video advertisements being updated based on a portion of the user interactions with the video advertisement that resulted in a presentation that was determined to be a play through of the video advertisement.

12. The system of claim 11, wherein the operations further comprise:
training a performance model using the performance features for the video advertisements, the performance model being trained to determine, based on features data for a video advertisement, the estimated play through rate of the video advertisement, the features data including data that are indicative of one or more visual features of the video advertisement.

13. The system of claim 12, wherein the performance model comprises a logistic regression model that includes coefficients for the visual features, the coefficient for each visual feature representing a relative weight of the visual feature for determining the estimated play through rate.

14. The system of claim 13, wherein the features data further include data that are indicative of one or more of a web property identifier; an advertiser identifier; a measured click through rate; geo location data; content of a web property associated with previous requests; and a measured play through rate.

15. The system of claim 10, wherein ranking the video advertisements based on the estimated play through rates for the video advertisements provided by the video advertisement performance model comprises:
selecting a quality adjustment for each of the video advertisements the quality adjustment for each of the video advertisements being selected based on the estimated play through rate for the video advertisement; and
ranking the video advertisements based, at least in part, on the selected quality adjustments.

16. The system of claim 15, wherein selecting a quality adjustment for each of the video advertisements comprises:
associating each of a plurality of quality adjustments with a corresponding range of estimated play through rates;
for each of the video advertisements:
determining the corresponding range of estimated play through rates that is inclusive of the estimated play through rate for the video advertisement; and
selecting, as the quality adjustment for the video advertisement, the quality adjustment associated with the corresponding range of estimated play through rates that is inclusive of the estimated play through rate for the video advertisement.

17. The system of claim 16, wherein ranking the video advertisements based on the estimated play through rates further comprises:
for each of the video advertisements, adjusting a bid associated with the video advertisement based on the quality adjustment for the video advertisement.

18. A system, comprising:
one or more computers that include a prediction engine and a scoring engine:
the prediction engine being operable to:
receive a score request; determine, based on features data for a video advertisement, an estimated play through rate for the video advertisement, the estimated play through rate being a value indicative of a likelihood that at least a predetermined amount of a duration of the video advertisement will be presented prior to occurrence of a user action that halts presentation of the video advertisement, the features data including data that are indicative of one or more visual features of the video advertisement; and
provide the estimated play through rate to the scoring engine;
the scoring engine being operable to:
identify video advertisements that are eligible to be provided in response to a request for video advertisements;
rank the video advertisements based on the estimated play through rates for the video advertisements; and
provide one or more of the video advertisements in response to the request and according to the ranking.

19. The system of claim 18, wherein the prediction engine comprises a logistic regression model that includes coefficients for the visual features, the coefficient for each visual feature representing a relative weight of the visual feature for determining the estimated play through rate.

20. The system of claim 19, wherein the features data further include data that are indicative of one or more of a web property identifier; an advertiser identifier; a measured click through rate; geo location data; content of a web property associated with previous requests; and a measured play through rate.

* * * * *

UNITED STATES PATENT AND TRADEMARK OFFICE
CERTIFICATE OF CORRECTION

| | | |
|---|---|---|
| PATENT NO. | : 8,209,715 B2 | Page 1 of 1 |
| APPLICATION NO. | : 12/271395 | |
| DATED | : June 26, 2012 | |
| INVENTOR(S) | : Lin Liao, Manish Gupta and Rajas Moonka | |

It is certified that error appears in the above-identified patent and that said Letters Patent is hereby corrected as shown below:

In Column 12, Line 2, please delete "advertisement;" and insert -- advertisement: --

In Column 14, Lines 14-15, please delete "advertisements" and insert -- advertisements, --

Signed and Sealed this
Twenty-first Day of August, 2012

David J. Kappos
*Director of the United States Patent and Trademark Office*